(12) United States Patent
Hosokawa et al.

(10) Patent No.: US 8,314,890 B2
(45) Date of Patent: Nov. 20, 2012

(54) IMAGE PROCESSING APPARATUS AND IMAGE PROCESSING METHOD

(75) Inventors: Kenichiro Hosokawa, Kanagawa (JP);
Masashi Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 13/053,573

(22) Filed: Mar. 22, 2011

(65) Prior Publication Data

US 2011/0242418 A1 Oct. 6, 2011

(30) Foreign Application Priority Data

Mar. 30, 2010 (JP) ................................. 2010-077035

(51) Int. Cl.
*H04N 5/00* (2006.01)
(52) U.S. Cl. .......................... 348/606; 348/576; 348/627
(58) Field of Classification Search .......... 348/606–607, 348/576, 571, 625, 627–629, 725, 451–452, 348/597, 421.1; 382/261, 254, 264, 266, 382/300; 358/1.9, 147, 461, 463; *H04N 5/00*
See application file for complete search history.

(56) References Cited

U.S. PATENT DOCUMENTS

| | | | | |
|---|---|---|---|---|
| 6,064,776 A | * | 5/2000 | Kikuchi et al. | 382/260 |
| 6,728,425 B1 | * | 4/2004 | Tokuyama et al. | 382/299 |
| 8,120,703 B2 | * | 2/2012 | Adams | 348/448 |
| 8,155,470 B2 | * | 4/2012 | Lee | 382/261 |

FOREIGN PATENT DOCUMENTS

JP 2002-359820 A 12/2002

* cited by examiner

*Primary Examiner* — Trang U Tran
(74) *Attorney, Agent, or Firm* — Wolf, Greenfield & Sacks, P.C.

(57) ABSTRACT

In an image processing apparatus, a min-max pixel difference value computing unit computes the difference between the maximum and minimum pixel values in a first image portion including a target pixel and neighbor pixels. A maximum adjacent pixel difference value computing unit computes the maximum value among the difference values between adjacent pixels in the first image portion. An image change feature value computing unit computes a feature value corresponding to the suddenness of image change in the first image portion. A filter coefficient computing unit computes filter coefficients. A sharpen filter accepts, as input, pixels forming a second image portion including the same target pixel as the first image portion and neighbor pixels, and computes an output pixel value for the target pixel.

5 Claims, 7 Drawing Sheets

IMAGE PROCESSING APPARATUS AND IMAGE PROCESSING METHOD

BACKGROUND OF THE INVENTION

1. Field of the Invention

The present invention relates to an image processing apparatus. More particularly, the present invention relates to an image processing apparatus and method for conducting image signal processing in order to increase the sharpness of an image.

2. Description of the Related Art

For example, when executing image signal processing such as changing the resolution of an image, there exists related art that sets coefficients as follows in a filter used in digital signal processing. First, a plurality of coefficients are computed in association with each of a plurality of fixed parameter values corresponding to the different resolutions. Next, a function corresponding to a curve that approximates these discrete coefficients is computed, and combinations of coefficients for the computed function may be stored as coefficient-related data for the filter coefficients, for example. Then, when executing image signal processing, filter coefficients are computed by substituting parameter values obtained according to user input, for example, into the variables of the function given by the coefficients expressed as the stored coefficient-related data. Filter processing based on the computed filter coefficients is then conducted. (See Japanese Unexamined Patent Application Publication No. 2002-359820 (FIG. 1), for example.) In so doing, filter processing can be conducted without storing a large number of filter coefficients corresponding to each of the possible parameter values, and it becomes possible to reduce memory.

SUMMARY OF THE INVENTION

At this point, consider an image sharpening process that increases the sharpness of an image as one example of a correction process with respect to an image. When conducting such a process, the following factors should be considered. For example, currently there is a trend of frequently inserting superimposed text such as captions, subtitles, and scrolling tickers (hereinafter referred to as telop content) into the images of television broadcasts and similar content. In addition, displaying a sub-picture together with the main picture on a single display screen has come to be widely used. This means that the portions of the overall image where the image content changes suddenly are increasing, and are also becoming more fine-grained. In other words, in the overall image, there have come to exist a large number of portions with greatly differing spatial frequency characteristics. For example, in such images, image portions with sudden image change may coexist with milder image portions. In other words, image portions tending towards high spatial frequencies and large amplitudes may coexist with image portions tending towards low spatial frequencies and small amplitudes.

For example, consider the case where an image sharpening process applied with uniform control values to the entirety of an image like that described above. In such cases, the sharpness may be overly increased in the image portions with sudden image change, and an unnatural image may easily result. If it is then assumed that the control values are reduced, for example, there is a tendency for the image portions with mild image change to be insufficiently sharp. In this way, it is difficult to apply appropriate sharpness to both the portions with sudden image change and the portions with mild image change using an image sharpening process that attempts to sharpen with the same control values for the entire image. Given this factor, an image sharpening process should individually apply control values to each portion of the entire image according to the suddenness of image change in each portion.

For example, in the case of the related art discussed earlier, the size of the data used to compute the filter coefficients for image processing can be reduced, thereby attempting to make processing more efficient. However, this related art assumes image processing applied to entire images, such as changing the resolution, for example, and is not compatible with image processing for applying different control values to individual portions of an image. For example, if an attempt were made to realize processing that applies different control values to individual portions of an image, then ordinarily processing such as the fast Fourier transform would be used. However, since such processing is complex and computationally intensive, in some cases it may be difficult to implement such processing in, for example, consumer electronics, which tends to have low signal processing capabilities.

In light of such circumstances, it is desirable to make possible an image sharpening process that applies different sharpen values according to the suddenness of image change in individual portions of an image, while also making the image sharpening process simple and efficient.

An image processing apparatus in accordance with an embodiment of the present invention includes: a min-max pixel difference value computing unit configured to compute a min-max pixel difference value defined as the difference between the maximum pixel value and the minimum pixel value in an image portion for feature value computation that includes a target pixel selected from among pixels forming an input image and a given number of neighbor pixels; a maximum adjacent pixel difference value computing unit configured to compute a maximum adjacent pixel difference value defined as the maximum value among the difference values between adjacent pixels in the image portion for feature value computation; an image change feature value computing unit configured to compute an image change feature value corresponding to the suddenness of image change in the image portion for feature value computation on the basis of the min-max pixel difference value and the maximum adjacent pixel difference value; a filter coefficient computing unit configured to compute filter coefficients on the basis of the image change feature value; and a sharpen filter configured to accept, as input, pixels forming an image portion for filter processing that includes the same target pixel as a given image portion for feature value computation and a given number of neighbor pixels, and compute an output pixel value for the target pixel in the image portion for filter processing by using filter coefficients corresponding to the given image portion for feature value computation. According to this configuration, image change feature values quantifying image change are computed on the basis of the min-max pixel difference value and the maximum adjacent pixel difference value of respective image portions for feature value computation. On the basis of these image change feature values, an image sharpening process having control values set on a per-pixel basis is executed.

The above image processing apparatus in accordance with an embodiment of the present invention may also be configured such that the number of pixels forming the image portion for feature value computation differs from the number of pixels forming the image portion for filter processing. According to this configuration, an image sharpening process is executed by selecting a suitable combination from among a variety of combinations of a number of pixels forming the image portion for feature value computation and a number of pixels forming the image portion for filter processing.

The above image processing apparatus in accordance with an embodiment of the present invention may also be configured to include a polynomial coefficient storage unit configured to store polynomial coefficients of a polynomial function for computing the filter coefficients, wherein the filter coefficient computing unit computes the filter coefficients by substituting the value of an image change feature value into the variable of a polynomial function given by polynomial coefficients stored in the polynomial coefficient storage unit. According to this configuration, filter coefficients are computed by evaluating a polynomial function using polynomial coefficient data and an image change feature value.

The above image processing apparatus in accordance with an embodiment of the present invention may also be configured such that the image change feature value computing unit sets a maximum value as the image change feature value in the case where the computed maximum adjacent pixel difference value is equal to or greater than an upper threshold value preset in association with the computed min-max pixel difference value, sets a minimum value as the image change feature value in the case where the maximum adjacent pixel difference value is less than or equal to a lower threshold value preset in association with the min-max pixel difference value, and computes the image change feature value on the basis of the ratio of the difference between the upper threshold value and the lower threshold value versus the difference between the maximum adjacent pixel difference value and the lower threshold value in the case where the maximum adjacent pixel difference value exists between the upper threshold value and the lower threshold value. According to this configuration, a value for the image change feature value is computed within a range from a maximum value to a minimum value in accordance with a combination of a maximum adjacent pixel difference value and a min-max pixel difference value.

According to an embodiment of the present invention, there is realized an image sharpening process that, while still being a simple process, modifies control values according to the suddenness of image change in individual portions of an entire image.

DESCRIPTION OF THE PREFERRED EMBODIMENTS

Hereinafter, embodiments for carrying out the present invention will be described. The description will proceed as follows.

1. First embodiment (exemplary execution of an image sharpening process on the basis of an image change feature value computed for each pixel)

2. Second embodiment (exemplary application of an image processing apparatus in accordance with the first embodiment to a television)

3. Modifications

1. First Embodiment

Exemplary Configuration of Image Processing Apparatus

Figure 1:
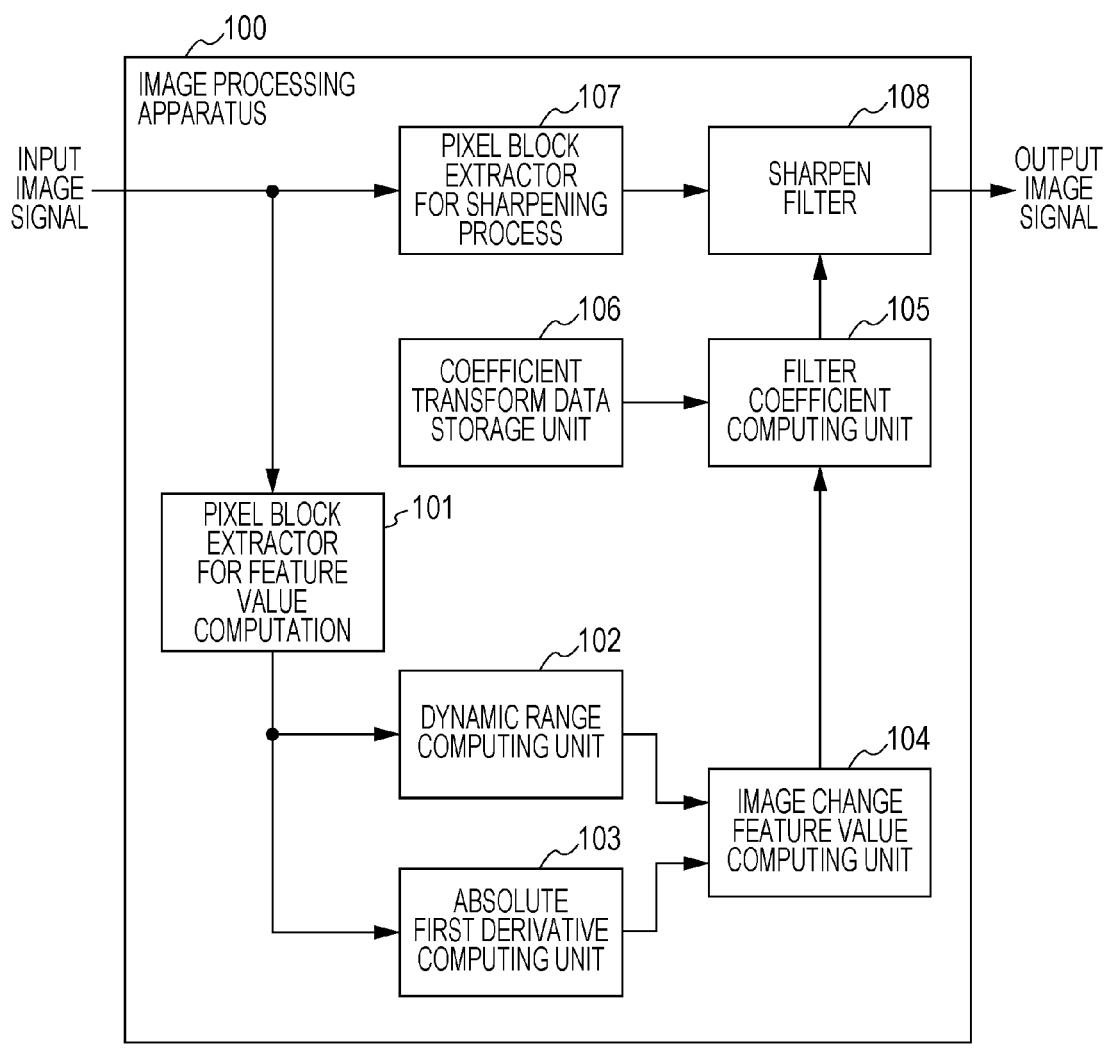
FIG. 1 illustrates an exemplary configuration of an image processing apparatus in accordance with a first embodiment of the present invention.

FIG. 1 illustrates an exemplary configuration of an image processing apparatus 100 in accordance with a first embodiment of the present invention. The image processing apparatus 100 illustrated in FIG. 1 executes image signal processing in the form of an image sharpening process that increases the sharpness of an image.

The image processing apparatus 100 illustrated in FIG. 1 is provided with a pixel block extractor for feature value computation 101, a dynamic range computing unit 102, an absolute first derivative computing unit 103, and an image change feature value computing unit 104. In addition, the image processing apparatus 100 is provided with a filter coefficient computing unit 105, a coefficient transform data storage unit 106, a pixel block extractor for the sharpening process 107, and a sharpen filter 108.

An input image signal into the image processing apparatus 100 is motion image data in a given digital signal format, and may be formed as successive sets of frame image data in a time series, for example. A single set of frame image data is formed by a plurality of pixels given by a horizontal pixel count and a vertical pixel count in accordance with a set resolution. The pixel block extractor for feature value computation 101 extracts an image portion given by a set horizontal pixel count and vertical pixel count from frame image data given as an input image signal, and acquires the extracted image portion as a pixel block for feature value computation. A pixel block for feature value computation is formed by a single target pixel selected from among the pixels forming the frame image data, as well as a given number of neighbor pixels arrayed near the target pixel. Furthermore, all pixels forming the frame image data are sequentially selected as the target pixel, and individual pixel block for feature value computation are sequentially extracted in correspondence with each of the sequentially selected target pixels. Consequently, in an embodiment of the present invention, for each set of frame image data, there are extracted pixel blocks for feature value computation equal to the number of pixels forming that set of frame image data.

The dynamic range computing unit 102 computes the dynamic range for an image portion given as a pixel block for feature value computation. An example of dynamic range computation will be described later. In addition, the absolute first derivative computing unit 103 computes the absolute first derivative (i.e., the absolute value of the first derivative) of an image portion given as a pixel block for feature value computation. An example of absolute first derivative computation will be described later. Herein, it should be appreciated that the dynamic range computing unit 102 is one example of a min-max pixel difference value computing unit. Also, the absolute first derivative computing unit 103 is one example of a maximum adjacent pixel difference value computing unit.

The image change feature value computing unit 104 computes an image change feature value on the basis of a dynamic range and absolute first derivative computed as described above. An image change feature value can be interpreted as a quantification of the spatial frequency characteristics of an image portion given as a pixel block for feature value computation, and may be interpreted as the quantification of the frequency and amplitude into a single value, for example. In other words, an image change feature value becomes a numerical representation of the degree of suddenness in the image change of an image portion expressed by a pixel block for feature value computation. An example of image change feature value computation will be described later.

The filter coefficient computing unit 105 computes filter coefficients corresponding to image change feature values by performing calculations using coefficient transform data read out from the coefficient transform data storage unit 106. An example of filter coefficient computation by the filter coefficient computing unit 105 will be described later.

The coefficient transform data storage unit 106 stores coefficient transform data, which is used in the computation of filter coefficients by the filter coefficient computing unit 105 as described above. In practice, the coefficient transform data storage unit 106 may be realized by means of non-volatile memory, read-only memory (ROM), or a given auxiliary storage apparatus, for example. As demonstrated in the exemplary filter coefficient computing process described hereinafter, coefficient transform data in an embodiment of the present invention is assumed to include functions for transforming a numerical value obtained as an image change feature value into a filter coefficient. Herein, it should be appreciated that the coefficient transform data storage unit 106 is one example of a polynomial coefficient storage unit.

Similarly to the above pixel block extractor for feature value computation 101, the pixel block extractor for the sharpening process 107 extracts an image portion given by a set horizontal pixel count and vertical pixel count from frame image data given as an input image signal, and in so doing, acquires a pixel block for the sharpening process. Also similarly, the pixel block extractor for the sharpening process 107 sequentially selects a target pixel, and sequentially extracts a pixel block for the sharpening process containing that target pixel. For example, the target pixel may be the same for a pixel block for feature value computation and a pixel block for the sharpening process that are extracted at the same time.

However, in an embodiment of the present invention, the pixel blocks for feature value computation and the pixel blocks for the sharpening process are respectively formed by different numbers of pixels. In other words, in an embodiment of the present invention, the number of pixels forming a pixel block for the purpose of computing an image change feature value is different from the number of pixels forming a pixel block used in a filter process for the purpose of sharpening. This means that freedom is given to set the number of pixels forming a pixel block for the purpose of computing an image change feature value, and the number of pixels forming a pixel block for the purpose of the sharpening filter process. For example, it can be expected that the sharpness that is visually perceived will be different depending on the combination of the respective numbers of pixels in the pixel blocks for feature value computation and the pixel blocks for the sharpening process. Thus, the combination of numbers of pixels for which the best visual sharpness is obtained may be specified by means of simulation conducted in advance, for example. The actual image sharpening process may then be executed by forming pixel blocks for feature value computation and pixel blocks for the sharpening process using the specified numbers of pixels. In this way, in an embodiment of the present invention, it becomes possible to more flexibly set sharpen effects, for example, compared to the case of using the same pixel blocks for both image change feature value computation and the sharpening filter process. Meanwhile, in FIGS. 2, 3, and 6 hereinafter described, pixel blocks for feature value computation and pixel blocks for the sharpening process are respectively illustrated as being rectangular overall, as a result of pixels being arrayed by a given number of rows and columns. However, it should be appreciated that such overall shapes of the pixel blocks for feature value computation and the pixel blocks for the sharpening process are merely examples, and that diamonds, circles, and various other shapes, for example, are also conceivable. Moreover, it is also conceivable for the pixel blocks for feature value computation and the pixel blocks for the sharpening process to have different shapes.

The sharpen filter 108 accepts a pixel group forming a pixel block for the sharpening process as input, and executes a filter process by means of filter coefficients computed by the filter coefficient computing unit 105. In so doing, an output pixel value is obtained for the target pixel in the input pixel block for the sharpening process. A single frame's worth of such output pixel values form frame image data given as an output image signal, for example.

Exemplary Dynamic Range Computing Process

Figure 2:
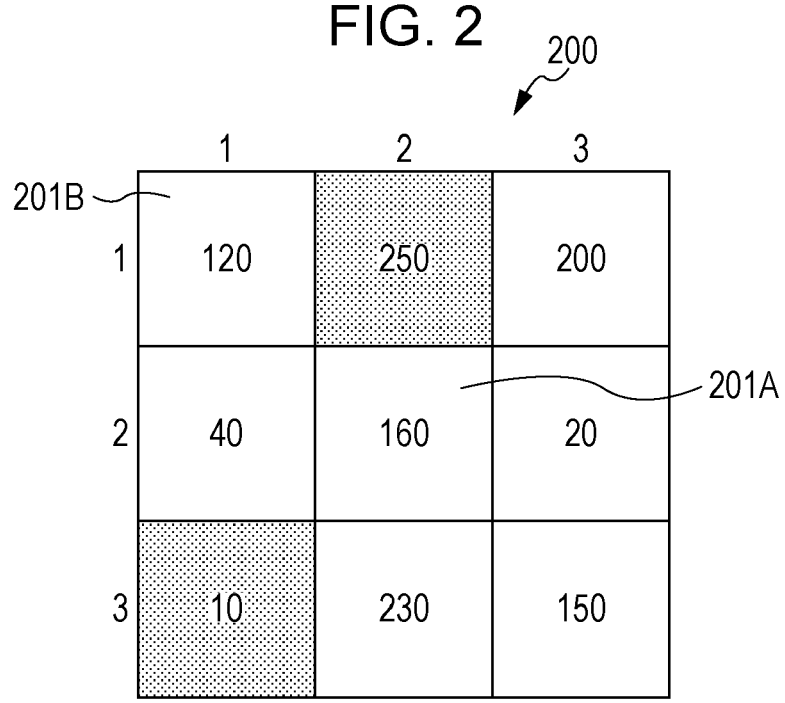
FIG. 2 explains an exemplary process for computing dynamic range in accordance with a first embodiment of the present invention.

Next, a specific example of a dynamic range computing process executed by the dynamic range computing unit 102 in FIG. 1 above will be described with reference to FIG. 2. FIG. 2 illustrates one example of a pixel block for feature value computation 200. By way of example, the pixel block for feature value computation 200 illustrated in FIG. 2 is formed by nine pixels 201 in a 3×3 arrangement. In cases where a pixel block is formed by nine pixels 201 in this way, the center pixel on the second row, second column becomes the target pixel 201A, while the surrounding eight pixels become neighbor pixels 201B.

In addition, in FIG. 2, specific examples of pixel values are illustrated for each of the nine pixels 201 forming the pixel block for feature value computation 200.

Herein, the respective pixel values illustrated in FIG. 2 are assumed for the case of using eight bits to express pixel values in 256 steps from 0 to 255.

The dynamic range computing unit 102 first recognizes the maximum pixel value and the minimum pixel value from among the pixel values expressed by the nine pixels 201 forming the input pixel block for feature value computation 200. In the case of FIG. 2, the pixel value "250" of the pixel 201 on the first row, second column is recognized as the maximum pixel, while the pixel value "10" of the pixel 201 on the third row, first column is recognized as the minimum pixel value. Next, the dynamic range computing unit 102 computes the absolute difference value between the recognized maximum value and minimum value. In the case of FIG. 2, the absolute difference value becomes "240". This absolute difference values becomes the dynamic range. In other words, the dynamic range herein is the absolute value of the difference between the maximum pixel value and the minimum pixel value in the pixel block for feature value computation 200.

Exemplary Absolute First Derivative Computing Process

Figure 3:
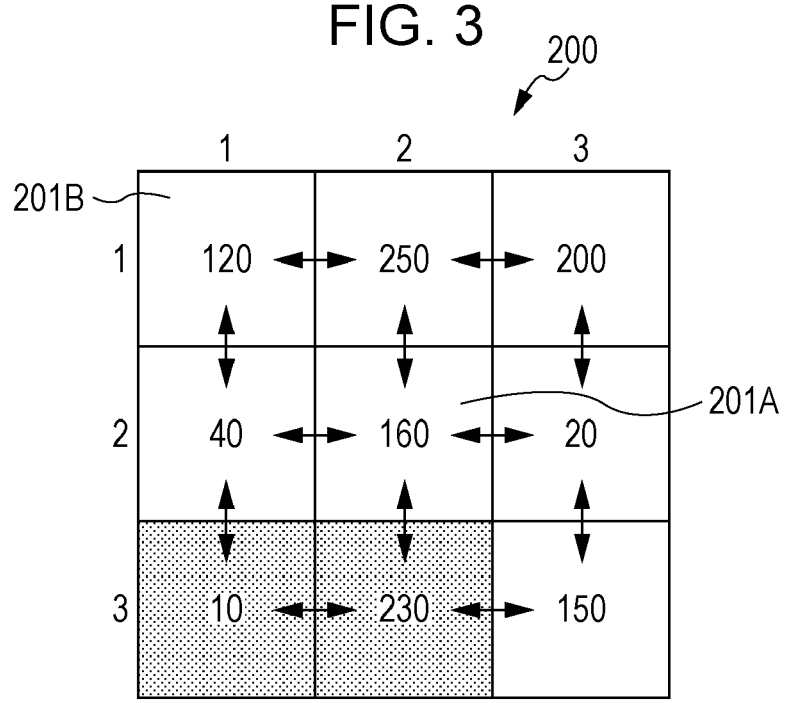
FIG. 3 explains an exemplary process for computing the absolute first derivative in accordance with a first embodiment of the present invention.

Next, an exemplary absolute first derivative computing process executed by the absolute first derivative computing unit 103 will be described with reference to FIG. 3. FIG. 3 illustrates the same pixel block for feature value computation 200 illustrated in the above FIG. 2. First, the absolute first derivative computing unit 103 computes the absolute difference values between the pixel values of adjacent pairs of pixels 201 in the horizontal direction and vertical direction of the input pixel block for feature value computation 200 (i.e., adjacent pixel difference values). In other words, in the case of FIG. 2, the absolute first derivative computing unit 103 computes adjacent pixel difference values between the pixel values of pixels as follows. In the horizontal direction, on each row from the first row to the third row, the absolute first derivative computing unit 103 computes an adjacent pixel difference value between the pixels 201 on the first and second columns, as well as between the pixels 201 on the second and third columns. In addition, in the vertical direction, on each column from the first column to the third column, the absolute first derivative computing unit 103 computes an adjacent pixel difference value between the pixels 201 on the first and second rows, as well as between the pixels 201 on the second and third rows. In this way, 12 adjacent pixel difference values are obtained from the pixel block for feature value computation 200 formed by a 3×3 arrangement of pixels 201.

After computing adjacent pixel difference values as described above, the absolute first derivative computing unit 103 selects the maximum value from among the computed adjacent pixel difference values, and outputs the selected value as the absolute first derivative. In the case of FIG. 2, the maximum adjacent pixel difference value is the value "220" computed from the pixel value "10" of the pixel 201 on the third row, first column and the pixel value "230" of the pixel 201 on the third row, second column. The absolute first derivative computing unit 103 thus outputs this value "220" as the absolute first derivative.

Herein, it is conceivable that, in addition to the adjacent pixel difference values in the horizontal and vertical directions as described with FIG. 3, the computation of the absolute first derivative may also involve computing adjacent pixel difference values between pixel pairs that are adjacent in a diagonal direction, for example. The maximum value from among these adjacent pixel difference values may then be taken to be the absolute first derivative.

Exemplary Image Change Feature Value Computing Process

Herein, the dynamic range computed as described earlier with FIG. 2 becomes a value expressing the approximate amount of change in pixel values when viewing the partial image region given by the pixel block for feature value computation 200 as a whole. The dynamic range can be interpreted as a feature value obtained in correspondence with the amplitude of the spatial frequency characteristics, for example.

In addition, the absolute first derivative computed as described earlier with FIG. 3 becomes a value expressing the fineness of the change in pixel values in the partial image region given by the pixel block for feature value computation 200. The absolute first derivative can be interpreted as a feature value corresponding to the frequency in the spatial frequency characteristics.

When hypothetically varying the dynamic range while keeping the absolute first derivative fixed, if the dynamic range decreases while the image fineness stays fixed, then the range of change in the image will decrease, and the image change will become more mild as a result. In contrast, if the dynamic range increases, then the range of change in the image will increase, and the image change will become more sudden as a result.

Similarly, when varying the absolute first derivative while keeping the dynamic range fixed, the range of change in the image will stay fixed, but as the absolute first derivative decreases, changes in the image will become broader, and the image change will become more mild as a result. In contrast, as the absolute first derivative increases, changes in the image will become more fine-grained, and the image change will become more sudden as a result.

In this way, it can be said that the suddenness of image change comes to be determined according to combinations of a dynamic range and an absolute first derivative, or in other words, according to the spatial frequency characteristics. An image sharpening process in accordance with an embodiment of the present invention reduces the sharpen amount as the image change becomes more sudden, and increases the sharpen amount as the image change becomes more mild. For this reason, it is preferable to quantify the degree of suddenness of image change for use in controlling the sharpening. In the description hereinafter, the degree of suddenness related to such image change will be referred to as the suddenness.

Thus, an embodiment of the present invention is configured to quantify the suddenness of image change by computing image change feature values using computed dynamic ranges and absolute first derivatives. Using computed dynamic ranges and absolute first derivatives as values corresponding to the spatial frequency characteristics, the visual change feature value computing unit 104 may compute image change feature values as described below by way of example.

Figure 4:
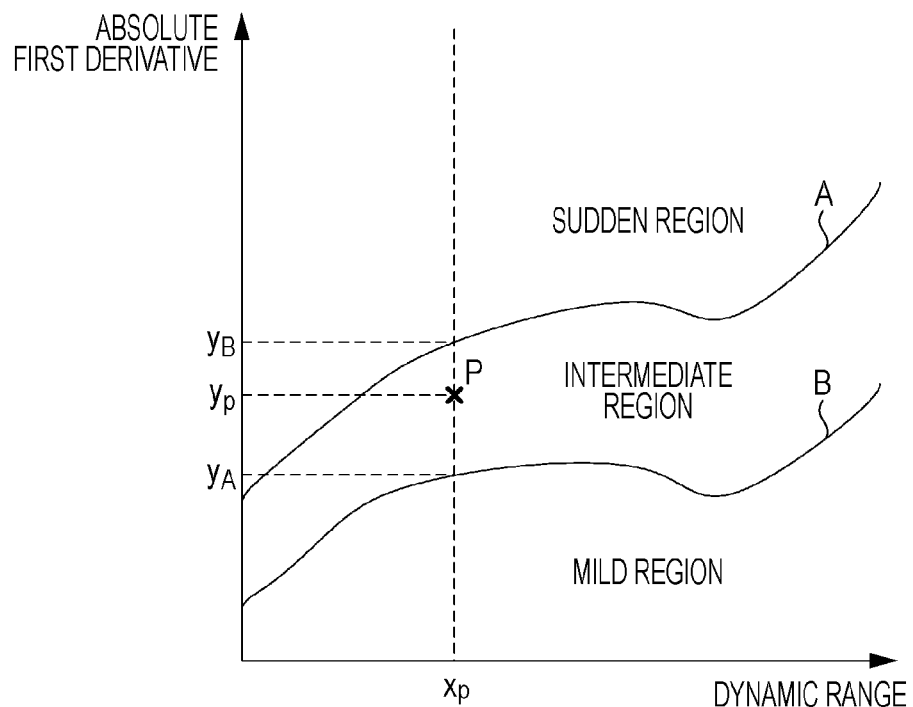
FIG. 4 explains an exemplary process for computing image change feature values in accordance with a first embodiment of the present invention.

FIG. 4 illustrates a two-dimensional (2D) feature value space expressed by the dynamic range and the absolute first derivative. In FIG. 4, the horizontal (X) axis represents the dynamic range, while the vertical (Y) axis represents the absolute first derivative. In this 2D feature value space in FIG. 4, two curves A and B are illustrated. The vertical axis coordinates along the curve A are respectively associated with possible values of the dynamic range, and correspond to preset upper threshold values of the absolute first derivative. The curve B is respectively associated with possible values of the dynamic range, and corresponds to preset lower threshold values of the absolute first derivative.

In the coordinate space in FIG. 4, the region in which the Y coordinate value $y_p$ (i.e., the absolute first derivative) is greater than the upper threshold value corresponding to the curve A is set as the sudden region. The region in which the Y coordinate value $y_p$ is less than the lower threshold value corresponding to the curve B is set as the mild region. Meanwhile, the region in which the Y coordinate value $y_p$ is between the curves A and B is set as the intermediate region.

In FIG. 4, a pair of coordinates corresponding to a combination of a computed dynamic range and absolute first derivative is expressed as $P(x_p,y_p)$. When the pair of coordinates P is contained in the sudden region, this indicates that the suddenness of the actual image change is high enough that an image sharpening process should be conducted using minimum control values, for example. When the pair of coordinates P is contained in the mild region, this indicates that the suddenness of the actual image change is low enough that an image sharpening process should be conducted using maximum control values, for example. When the pair of coordinates P is contained in the intermediate region, the suddenness of the image change is intermediate between the that of the sudden region and the mild region. In such cases, the control values of the image sharpening process should be set according to the actual suddenness, for example.

Furthermore, the visual change feature value computing unit 104 computes an image change feature value f according to, for example, the following feature value computation formula. In the following formula, $P(x_p,y_p)$ is taken to be a pair of coordinates corresponding to a combination of a computed dynamic range and absolute first derivative, $(x_p,y_A)$ is taken to be the coordinates on the curve A corresponding to the upper threshold value $y_A$ at the point where $x=x_p$, and $(x_p,y_B)$ is taken to be the coordinates on the curve B corresponding to the lower threshold value $y_B$ at the point where $x=x_p$.

$$f = \begin{cases} f_l & (y_P < y_A) \\ f_h & (y_P > y_B) \\ \frac{f_h - f_l}{y_B - y_A}(y_P - y_A) + f_l & (y_A \le y_P \le y_B) \end{cases}$$

In other words, in this example, when the pair of coordinates $P(x_p,y_p)$ is contained in the sudden region, a given maximum value $f_h$ is uniformly applied as the image change feature value f. When the pair of coordinates $P(x_p,y_p)$ is contained in the mild region, a given minimum value $f_l$ is uniformly applied as the image change feature value f. When the pair of coordinates $P(x_p,y_p)$ is contained in the intermediate region, the value of the image change feature value f is uniquely computed on the basis of the ratio of the distance from the lower threshold value $y_B$ to the upper threshold value $y_A$ versus the distance from the lower threshold value $y_B$ to the Y coordinate value $y_p$.

Herein, it is conceivable to set the upper threshold value $y_A$ and the lower threshold value $y_B$ associated with individual dynamic range values (i.e., the curves A and B in FIG. 4) as follows. For example, on the basis of the relationship between the dynamic range and absolute first derivative values and the spatial frequency characteristics, calculations may be performed using a formula that obeys given rules, taking the dynamic range as a variable. In so doing, an upper threshold value $y_A$ and a lower threshold value $y_B$ corresponding to individual dynamic range values can be uniquely computed. Alternatively, an actual image signal corresponding to a combination of a dynamic range and an absolute first derivative may be generated and displayed, and the suddenness of image change may be visually determined or measured from the displayed image, for example. An upper threshold value $y_A$ and a lower threshold value $y_B$ may then be decided on the basis of the determination results or the measurement results.

In this way, in an embodiment of the present invention, the suddenness of image change is quantified by computing image change feature values using two feature values: the dynamic range, and the absolute first derivative. As described earlier, the dynamic range and the absolute first derivative can be interpreted as being values that correspond to spatial frequency characteristics. Consequently, instead of computing dynamic range and absolute first derivative values, it is possible to analyze and compute the actual spatial frequency characteristics of pixel blocks for feature value computation 200, and then use the frequency characteristics to compute image change feature values.

However, computing the spatial frequency characteristics involves intensive analysis processing such as the fast Fourier transform, for example. As described later, in practice, an image processing apparatus 100 in accordance with an embodiment of the present invention is favorable for implementation in televisions and similar consumer electronics, for example. However, it is difficult to implement high-speed digital signal processing circuit in such consumer electronics due to cost and other problems. Consequently, there is demand for image processing and other computation to be as non-intensive as possible. As described earlier, the dynamic range and absolute first derivative values in an embodiment of the present invention can be obtained by computing the difference between the maximum and minimum pixel values, or by computing the maximum adjacent pixel difference value, for example, as described by means of FIGS. 2 and 3. In other words, the dynamic range and absolute first derivative values can be computed using extremely simple and non-intensive processes. Moreover, as described by way of example using FIG. 4 and the above feature value computation formula, the technique for computing image change feature values, although simple, enables values to be computed with sufficient accuracy for an image sharpening process, as long as an upper threshold value $y_A$ and a lower threshold value $y_B$ are suitably set.

Exemplary Coefficient Transform Data

Next, coefficient transform data stored in the coefficient transform data storage unit 106 will be simply described. The coefficient transform data is created as follows. First, learning sets are prepared. Each learning set includes a teacher image, and a plurality of student images obtained by, for example, applying blur processing to the teacher image. A plurality of learning sets with different characteristics between the teacher image and the student images are prepared. More specifically, a learning set with characteristics corresponding to those of the sudden region illustrated in FIG. 4, a learning set with characteristics corresponding to those of the mild region, and a learning set with a plurality of different characteristics corresponding to those of the intermediate region are prepared.

Regression coefficients between the teacher image and the student images in each learning set are then learned as filter coefficients. Depending on the learning for each learning set, a plurality of filter coefficients may be computed for each pixel forming a pixel block for feature value computation, for example. In this case, by preparing a plurality of learning sets with different characteristics between the teacher image and the student images, filter coefficients for applying different sharpen amounts depending on the particular characteristics are obtained.

Next, a plurality of different fixed values are prepared for the image change feature values (i.e., the parameters in this case). These fixed parameter values and the computed filter coefficients are then used to evaluate a polynomial function for computing filter coefficients. For example, the method of least squares or similar technique may be used, with the parameters given as image change feature values being substituted in as variables.

In an embodiment of the present invention, combinations of coefficients in the polynomial function evaluated in this way (i.e., the polynomial coefficients) become the coefficient transform data. For example, if the polynomial function for computing filter coefficients is evaluated as a third-order polynomial function ($y=ax^3+bx^2+cx+d$), then the combination of the polynomial coefficients a, b, c, and d from each term becomes coefficient transform data. Coefficient transform data is computed for each tap in the sharpen filter 108. The coefficient transform data computed for each tap is then stored in the coefficient transform data storage unit 106.

Exemplary Filter Coefficient Computing Process

Figure 5:
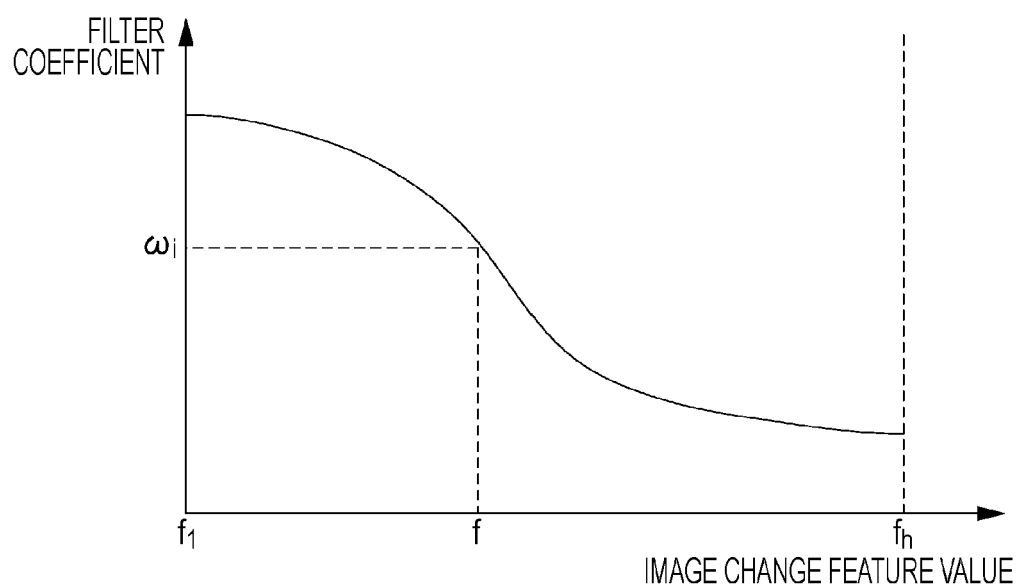
FIG. 5 explains an exemplary process for computing filter coefficients in accordance with a first embodiment of the present invention.

An exemplary filter coefficient computing process executed by the filter coefficient computing unit 105 will now be described. FIG. 5 illustrates a function graph obtained by coefficient transform data corresponding to a single tap. As FIG. 5 demonstrates, a single filter coefficient $\omega_i$ is specified and computed by substituting as a variable an arbitrary image change feature value f from among the possible values between the minimum value $f_l$ and the maximum value $f_h$.

In practice, the filter coefficient computing unit 105 may compute filter coefficients as follows, for example. First, the filter coefficient computing unit 105 reads out the coefficient transform data corresponding to the ith tap from the coefficient transform data storage unit 106, for example. Next, the filter coefficient computing unit 105 applies the polynomial coefficients expressed as the coefficient transform data to a function, and computes the filter coefficient $\omega_i$ by substituting the image change feature value f into the function. This process for computing the filter coefficient $\omega_i$ is then successively executed for each tap. In so doing, a plurality of filter coefficients $\omega_i$ corresponding to the respective taps actually provided in the sharpen filter 108 are computed.

If the polynomial coefficients given as coefficient transform data correspond to a third-order function, for example, then the process for computing a filter coefficient $\omega_i$ for the ith tap of the sharpen filter 108 as described above can be expressed by the following coefficient transform formula. In the following coefficient transform formula, j ($0 \geq 3$) represents the order of the term in the third-order function, from 0 to 3. Also, $k_{ij}$ represents the coefficient of the jth (i.e., the 0th to 3rd) term corresponding to the ith tap (i.e., $k_{ij}$ represents the polynomial coefficient).

$$\omega_i = \sum_{j=0}^{3} k_{ij} \cdot f^j$$

According to the above coefficient transform formula, $k_{i0}$, $k_{i1} \cdot f$, $k_{i2} \cdot f^2$, and $k_{i3} \cdot f^3$ are successively computed as the values of the 0th to the 3rd terms, and the filter coefficient $\omega_i$ is computed by summing the values of the terms. In other words, as described earlier, the filter coefficient $\omega_i$ is computed by substituting an image change feature value f into the variable x of a function to which polynomial coefficients given as coefficient transform data have been applied.

For computing filter coefficients, instead of the above coefficient transform data, it is also conceivable to store table data expressing filter coefficient values corresponding to possible values for the image change feature value. In this case, the filter coefficient computing unit 105 reads out the filter coefficients associated with the value of the image change feature value from the above table. However, since such a table would be created from the data for large numbers of filter coefficients corresponding to combinations of image change feature values and taps, the data size of such a table would be quite large. For this reason, such a table would consume much of the capacity of the actual memory or other component where the table is stored, for example. In contrast, with the coefficient transform data in accordance with an embodiment of the present invention, just the values of polynomial coefficients corresponding to individual taps may be stored, for example, and the data size of the coefficient transform data as a whole can be greatly reduced. In so doing, the storage capacity for storing the coefficient transform data is also greatly reduced. Furthermore, when computing the filter coefficients, the computational process becomes a simple and non-intensive process of evaluating a polynomial function of given order, as illustrated by the coefficient transform formula given above, for example.

The relationship between image change feature values f and filter coefficients will now be described. Given an image change feature value that is less than the minimum value $f_l$, there are computed filter coefficients which yield the largest control values within the range of configurable sharpen control values. Given an image change feature value that is greater than the maximum value $f_h$, there are computed filter coefficients which yield the smallest control values. Meanwhile, given an image change feature value in the range equal to or greater than the minimum value $f_l$ and less than or equal to the maximum value $f_h$, there are computed filter coefficients which yield sharpen amounts that depend on the value of the image change feature value f. The coefficient transform data described earlier is created so as to obtain the above filter coefficients that depend on the image change feature value f.

Exemplary Image Sharpening Process

Figure 6:
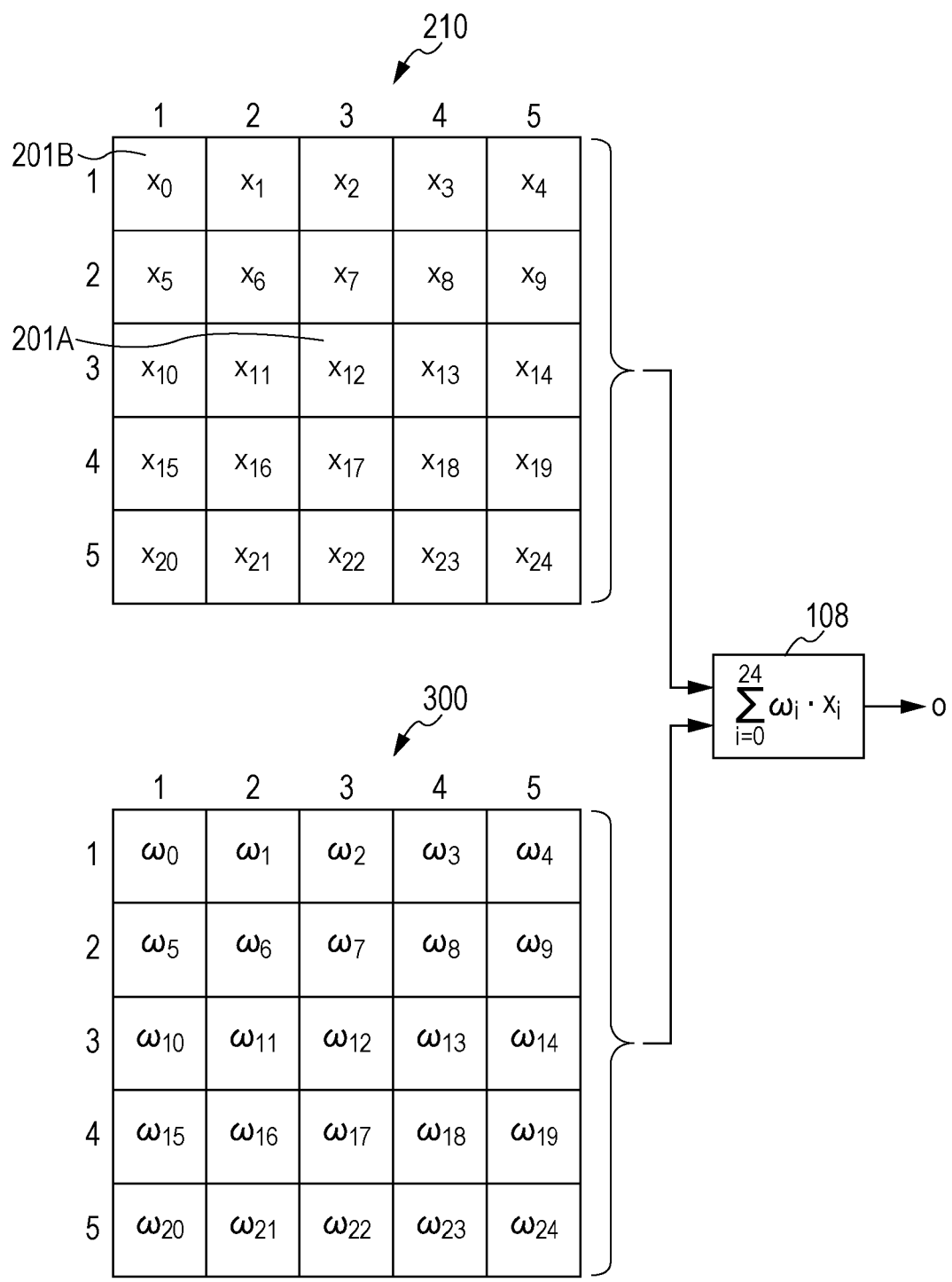
FIG. 6 illustrates an exemplary filter process of a sharpen filter in accordance with a first embodiment of the present invention.

An image sharpening process executed by the sharpen filter 108 will now be described. First, a pixel block for the sharpening process that is extracted by the pixel block extractor for the sharpening process 107 will be described. FIG. 6 illustrates an exemplary pixel block for the sharpening process 210.

The pixel block for the sharpening process 210 illustrated in FIG. 6 contains a single target pixel 201A and a given plurality of neighbor pixels 201B, similarly to the pixel block for feature value computation 200 illustrated earlier in FIGS. 2 and 3. However, as described earlier, in an embodiment of the present invention, the number of pixels forming a pixel block for the sharpening process 210 differs from the number of pixels forming a pixel block for feature value computation 200.

Herein, the pixel block for the sharpening process 210 in FIG. 6 is illustrated as containing a total of 25 pixels 201 (5 pixels horizontally by 5 pixels vertically). However, this is merely to illustrate that the number of pixels differs from the number of pixels forming the pixel block for feature value computation 200 illustrated in FIGS. 2 and 3. In practice, the number of pixels forming a pixel block for the sharpening process 210 is not particularly limited, and a suitable number of pixels may be set with consideration for factors such as the effects of the image sharpening process that would be actually obtained, for example.

However, as the following explanation demonstrates, the number of pixels forming a pixel block for the sharpening process 210 is the same as the number of taps in the sharpen filter 108. For example, when actually constructing an image processing apparatus 100, the number of pixels forming a pixel block for the sharpening process 210 is first determined with consideration for factors such as the sharpen effects. Then, in accordance with this determination, the sharpen filter 108 is configured with a number of taps equal to the number of pixels forming a pixel block for the sharpening process 210.

The sharpen filter 108 executes an image sharpening process as follows. In the description herein, a pixel block for the sharpening process 210 is assumed to contain 24 pixels, with reference to FIG. 6. Correspondingly, the number of taps provided in the sharpen filter 108 becomes 25, from the 0th tap to the 24th tap.

As illustrated in FIG. 6, the sharpen filter 108 accepts a pixel block for the sharpening process 210 and a filter coefficient group 300 as input. In the pixel block for the sharpening process 210 in FIG. 6, pixel values $x_0$ to $x_{24}$ are respectively illustrated for each of the 25 pixels 201 from the 0th to the 24th pixel. In addition, as illustrated in FIG. 6, the filter coefficient group 300 contains 25 filter coefficients from the 0th filter coefficient $\omega_0$ to the 24th filter coefficient $\omega_{24}$, which corresponds to the sharpen filter 108 having 25 taps. These filter coefficients have been computed for each tap using the filter coefficient computing process described earlier.

The sharpen filter 108 sets filter coefficients from the 0th filter coefficient $\omega_0$ to the 24th filter coefficient $\omega_{24}$ ($0 \leq i \leq 24$) with respect to the 25 taps from the 0th tap to the 24 tap. Then, for each tap from the 0th tap to the 24th tap, the sharpen filter 108 inputs and multiplies the pixel values from $x_0$ to $x_{24}$ for each of the pixels 201 from the 0th pixel to the 24th pixel. Next, the sharpen filter 108 sums the multiplied results. In other words, the sharpen filter 108 performs a multiply—accumulate operation on the pixel values and filter coefficients. In so doing, an output pixel value o is output from the sharpen filter 108 as the result of applying a correction corresponding to sharpening to the pixel value $x_{12}$ of the target pixel 201A.

The above filter processing of the sharpen filter 108 can be expressed by the following filter operation formula for computing an output pixel value o, where i is a variable expressing the tap number.

$$o = \frac{\sum_i \omega_i \cdot x_i}{\sum_i \omega_i}$$

As expressed by the numerator of the above filter operation formula, an output pixel value o is computed by performing a multiply-accumulate operation, wherein a filter coefficient $\omega_i$ and a pixel value $x_i$ are multiplied for each ith tap, and the multiplied values are then summed together. Herein, the denominator of the above filter operation formula is the sum of the filter coefficients corresponding to the individual taps. In an image filter process, the filter coefficients of the individual taps are set to sum to 1. Likewise, in an embodiment of the present invention, the filter coefficients corresponding the individual taps are set to sum to 1. Consequently, the sharpen filter 108 in effect performs the multiply-accumulate operation expressed by the numerator of the above filter operation formula.

An output image signal (i.e., the output of the image processing apparatus 100 in FIG. 1) is obtained from the output pixel values o computed with respect to individual target pixels 201A sequentially selected in a time series. the image obtained by the output image signal may be, for example, an image wherein sharpening has been reduced in accordance with increased image change in image portions. In contrast, the resulting image may be an image wherein sharpening has been increased in accordance with decreased image change in image portions. As a result, portions with too much sharpening and portions with too little sharpening are no longer mixed into the image, and uniformly suitable sharpness is obtained for the entire image.

Exemplary Processing Sequence Executed by Image Processing Apparatus

Figure 7:
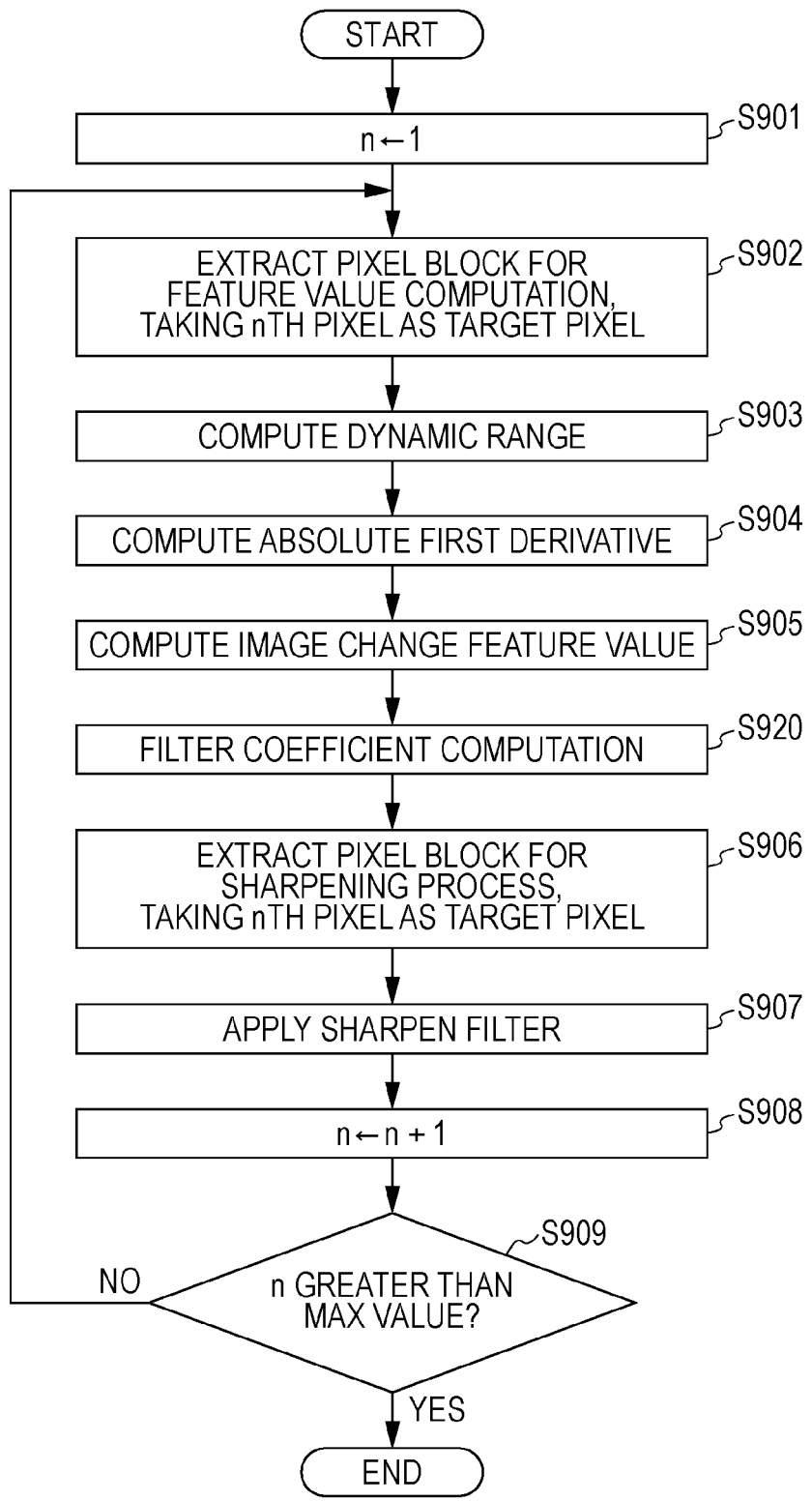
FIG. 7 illustrates an exemplary processing sequence for image sharpening executed by an image processing apparatus in accordance with a first embodiment of the present invention.
Figure 8:
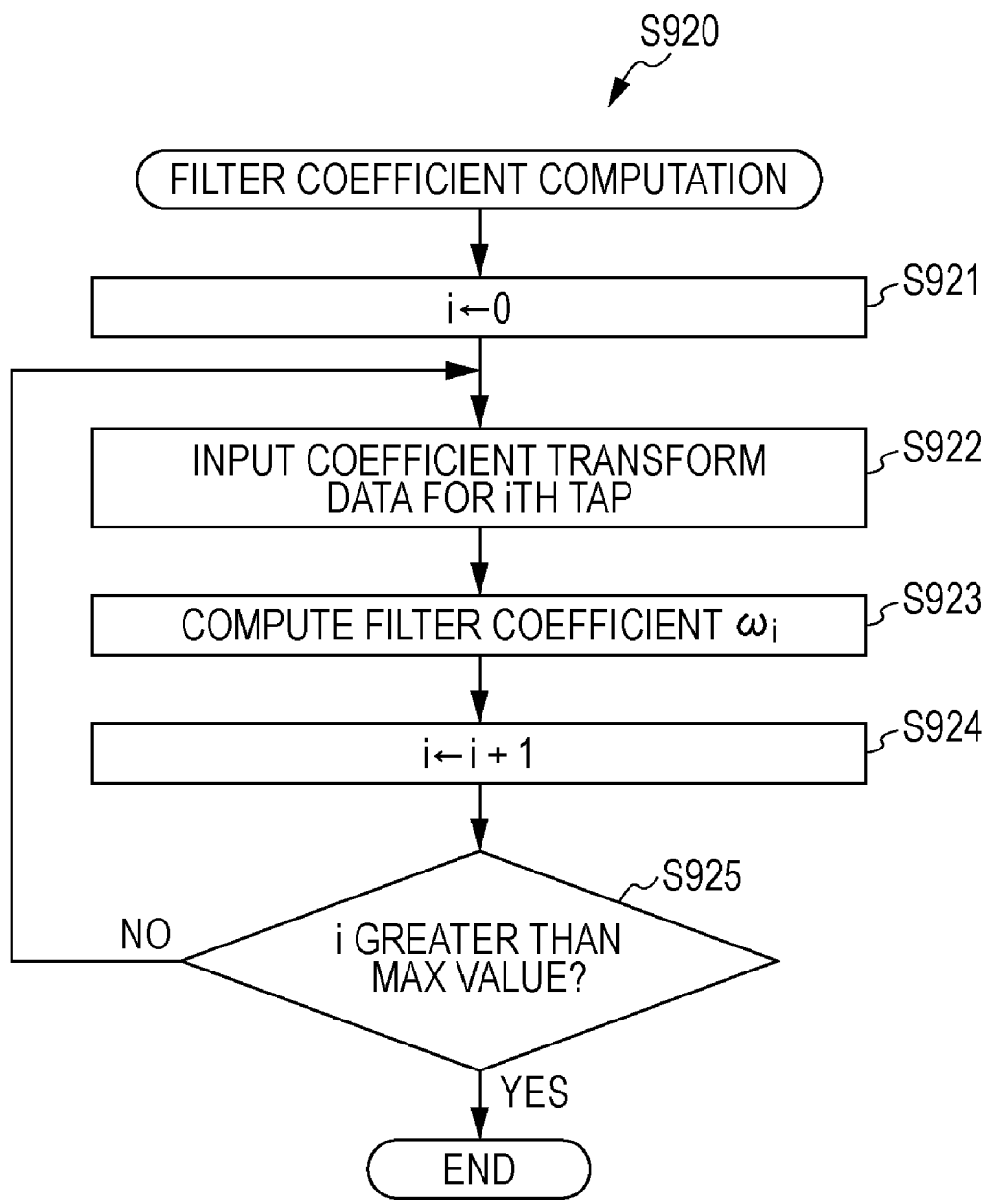
FIG. 8 illustrates an exemplary processing sequence for filter coefficient computation executed by a filter coefficient computing unit in accordance with a first embodiment of the present invention.

The flowcharts in FIGS. 7 and 8 illustrate an exemplary processing sequence executed by an image processing apparatus 100 in accordance with an embodiment of the present invention illustrated in FIG. 1. FIG. 7 illustrates an exemplary processing sequence for an image sharpening process executed by an image processing apparatus 100 with respect to a single set of frame image data. The image processing apparatus 100 repeatedly executes the process illustrated in FIG. 7 every time a set of frame image data is input as an input image signal.

In FIG. 7, the pixel block extractor for feature value computation 101 first initializes by substituting 1 into a variable n expressing a number assigned to the individual pixels forming a single set of frame image data (step S901). Subsequently, the pixel block extractor for feature value computation 101 selects the nth pixel from among the pixels forming the current frame image data as the target pixel 201A. In addition, the pixel block extractor for feature value computation 101 executes a process for extracting a pixel block for feature value computation 200 as described earlier using FIG. 2, for example (step S902).

Subsequently, the dynamic range computing unit 102 takes the pixel block for feature value computation 200 extracted in the above step S901, and computes the dynamic range as described earlier using FIG. 2, for example (step S903). Also, the absolute first derivative computing unit 103 computes the absolute first derivative of the same pixel block for feature value computation 200 as described earlier using FIG. 2, for example (step S904).

The visual change feature value computing unit 104 computes an image change feature value as described earlier using FIG. 4, by using the dynamic range computed in the above step S903 and the absolute first derivative computed in the above step S904 (step S905).

On the basis of the image change feature value computed in the above step S905, the filter coefficient computing unit 105 executes a process for computing filter coefficients for each tap as described earlier using FIG. 5 (step S920).

The pixel block extractor for the sharpening process 107 extracts a pixel block for the sharpening process 210 taking the nth pixel as the target pixel as described earlier using FIG. 6, for example (step S906). The sharpen filter 108 then executes sharpen filter processing with respect to the nth pixel as follows (step S907). In other words, the sharpen filter 108 respectively sets the filter coefficients computed in the above step S920 for each tap, for example. The individual pixels 201 forming the pixel block for the sharpening process 210 extracted in the above step S906 are then input into corresponding taps, the pixel values are multiplied by the filter coefficients, and the multiplied results are summed together. The results of the multiply-accumulate operation are output as the output pixel value o for the nth pixel.

Subsequently, the pixel block extractor for feature value computation 101, for example, increments the variable n (step S908), and determines whether or not the current variable n is greater than a maximum value (step S909). Herein, the maximum value of the variable n is the number of pixels forming a single set of frame image data. When the variable n is less than or equal to the maximum value, there still remain pixels in the current frame image data which have not yet been processed by the sharpen filter 108. Thus, in this case, the process returns to step S902. Once all pixels in the current frame image data have been processed, it is determined in step S909 that the current variable n has become greater than the maximum value. In this case, the processing from step S901 is executed again as an image sharpening process corresponding to the next set of frame image data, for example.

FIG. 8 illustrates an exemplary processing sequence for computing filter coefficients, illustrated as step S920 in FIG. 7. First, the filter coefficient computing unit 105 initializes by substituting 0 into a variable i corresponding to a number assigned to the taps in the sharpen filter 108 (step S921). Next, the filter coefficient computing unit 105 reads out and inputs coefficient transform data corresponding to the ith tap from the coefficient transform data storage unit 106 (step S922).

Subsequently, the filter coefficient computing unit 105 computes the filter coefficients $\omega_i$ (step S923). As described earlier, coefficient transform data expresses coefficients of a polynomial function (i.e., polynomial coefficients) for computing filter coefficients. Thus, the filter coefficient computing unit 105 takes a polynomial function obtained by setting the polynomial coefficients given by the coefficient transform data input in the above step S922, and substitutes into the variable of the polynomial function the value of the image change feature value computed earlier in step S905 in FIG. 7. The values of functions evaluated in this way become the filter coefficients $\omega_i$.

The filter coefficient computing unit 105 increments the variable i (step S924), and determines whether or not the current variable i is greater than a maximum value (step S925). Herein, the maximum value of the variable n is one less than the number of taps in the sharpen filter 108. When it is determined in step S925 that the variable i is less than or equal to the maximum value, filter coefficients corresponding to the ith and subsequent taps have not yet been computed. Thus, in this case, the process returns to step S922. Once filter coefficients have been computed for all taps, it is determined in step S925 that the variable i is greater than the maximum value, and the filter coefficient computing process given by step S920 is terminated.

2. Second Embodiment

Configuration of Television

The image processing apparatus 100 described using FIGS. 1 to 8 can be realized by a television, for example.

Thus, a television to which a configuration of the image processing apparatus 100 has been applied will be described as a second embodiment of the present invention.

Figure 9:
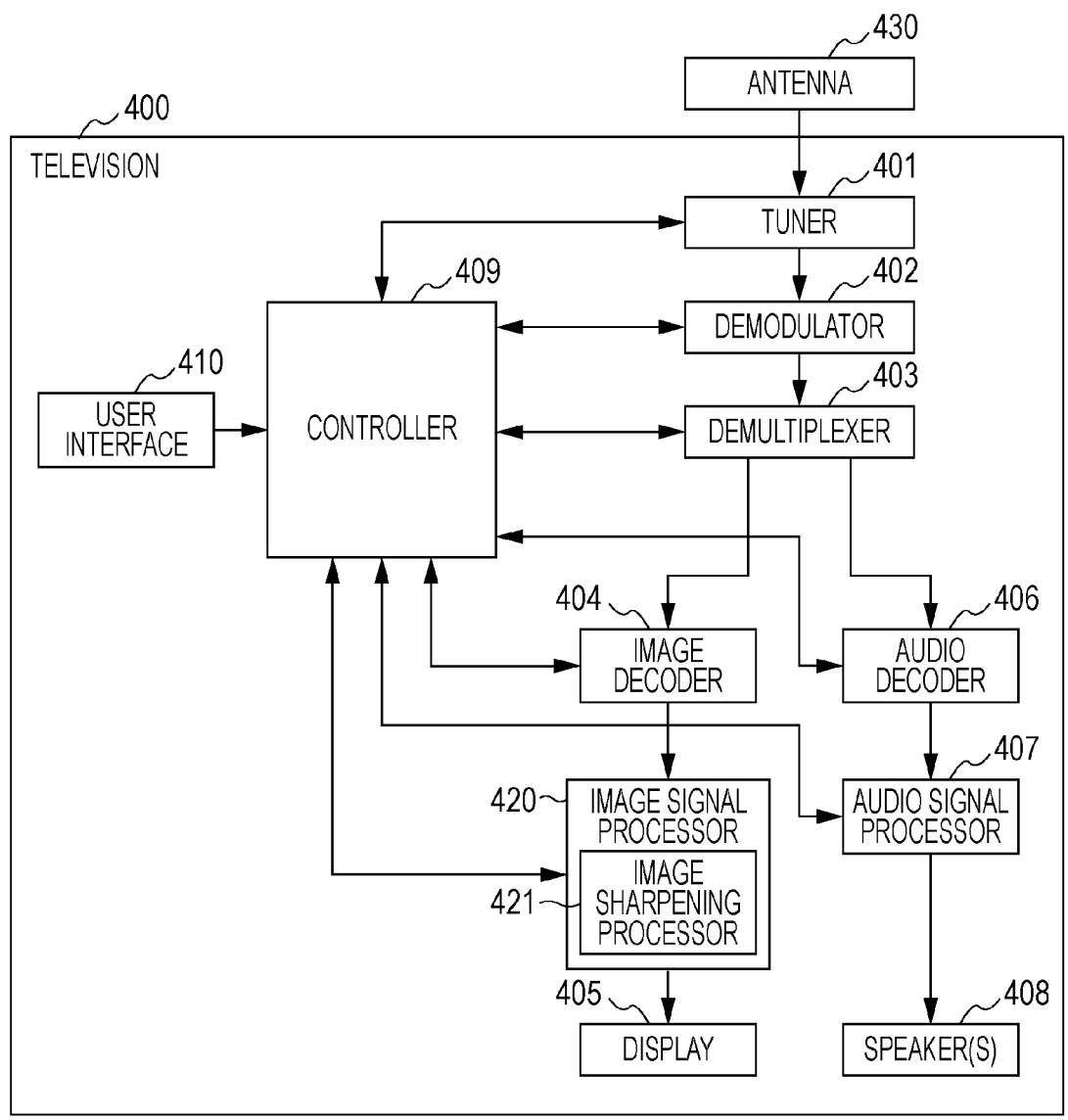
FIG. 9 illustrates an exemplary configuration of a television in accordance with a second embodiment of the present invention.

FIG. 9 illustrates an exemplary configuration of a television 400 in accordance with a second embodiment. The television 400 illustrated in FIG. 9 is provided with a tuner 401, a demodulator 402, a demultiplexer 403, an image decoder 404, an image signal processor 420, a display 405, an audio decoder 406, an audio signal processor 407, and one or more speakers 408. In addition, the television 400 is provided with a controller 409 and a user interface 410. An antenna 430 is also connected to the television 400.

The antenna 430 receives broadcast airwaves. The tuner 401 accepts as input an incoming signal produced as a result of an airwave being received by the antenna 430, and extracts a frequency signal corresponding to a digital broadcast channel specified by the controller 409, for example.

The demodulator 402 performs demodulation processing such as Viterbi decoding and error correction with respect to a frequency signal input from the tuner 401. A transport stream signal containing data for a specified channel is obtained by this demodulation processing.

The demultiplexer 403 extracts compressed image data and compressed audio data corresponding to the specified channel from the transport stream signal. The compressed image data thus extracted is output to the image decoder 404. The compressed audio data thus extracted is output to the audio decoder 406.

The image decoder 404 obtains an image signal in a given digital format by executing a decoding process for decompressing the compressed image data input from the demultiplexer 403.

The image signal processor 420 accepts as input an image signal output from the image decoder 404, and executes various relevant image signal processes, such as image quality adjustment, for example. The image signal processor 420 is also capable of executing an image sharpening process as one such relevant image signal process. For this reason, an image sharpening processor 421 is provided in the image signal processor 420. The image sharpening processor 421 may, for example, adopt a configuration similar to that of the image processing apparatus 100 in FIG. 1 described as the first embodiment.

For example, the image sharpening processor 421 may accept as input an image signal that has been subjected to image signal processing up to a given stage in the image signal processor 420. An image signal that has been processed for image sharpening as described earlier is then obtained.

An image signal that has been subjected to relevant image signal processes by the image signal processor 420 is output to the display 405. The display 405 displays the input image signal as an image. Herein, it should be appreciated that the display device actually implemented as the display 405 is not particularly limited, and may be a liquid crystal display (LCD), an organic electro-luminescence (EL) display, or a plasma display, for example. Assume, for example, that an image signal subjected to an image sharpening process by the image sharpening processor 421 is being displayed on the display 405. The image being displayed at this point has had its image quality adjusted so as to obtain uniformly suitable sharpness despite any differences in sharpness among individual portions of the original image overall.

The audio decoder 406 obtains an audio signal in a given digital format by conducting a decoding process for decompressing compressed audio data input from the demultiplexer 403.

The audio signal processor 407 accepts as input an audio signal from the audio decoder 406, and executes relevant digital audio signal processes, such as audio quality adjustment and volume adjustment, for example, and audio signal amplification. The audio signal processor 407 also sets output timings such that the audio signal is played back in synchronization with the image signal. An audio signal amplified by the audio signal processor 407 may be emitted as audio by supplying the signal to the one or more speakers 408, for example.

The controller 409 controls individual components in the television 400. The controller 409 is provided with a central processing unit (CPU), read-only memory (ROM), and random access memory (RAM), for example.

The user interface 410 collectively represents components such as various user interface elements provided on the main body of the television 400, as well as a user interface signal output unit that generates a user interface signal in response to the user interface elements being operated and outputs the user interface signal to the controller 409. The user interface 410 may also include components such as, for example, a remote control compatible with the television 400, as well as a receiver internal to the television 400 that receives a command signal from the remote control, converts the command signal into a user interface signal, and outputs the result. The controller 409 executes relevant controls and processes in response to user interface signals input from the user interface 410. In so doing, the television 400 operates appropriately in response to user operations.

In cases where an image sharpening process in accordance with an embodiment of the present invention is applied to such a television 400, for example, it is possible to configure the image sharpening process to turn on or off in response to user operation. It is also possible to modify the strength of the image sharpening in response to user operation. Even if the strength of the image sharpening is modified in this way, a sharpness that the user perceives as appropriate is still uniformly obtained for the entire image.

Furthermore, equipment realizing an image processing apparatus 100 based on an embodiment of the present invention is not limited to the above television 400. An embodiment of the present invention may be applied to various video equipment, such as a monitor that displays an image expressed by an input image signal, or a broadcast tuner that receives television broadcasts and outputs an image signal on a selected channel, for example.

Also, an image processing apparatus 100 or image sharpening processor 421 in accordance with an embodiment of the present invention may be realized in hardware, or alternatively, by causing a digital signal processor (DSP) or CPU to execute a program. In this respect, it is also possible for an embodiment of the present invention to be realized as an application program executed by a personal computer or similar device.

3. Modifications

Exemplary Application of an Image Sharpening Process in Accordance with an Embodiment of the Present Invention to an Image Noise Reduction Process Modifications of an embodiment of the present invention will now be described. For example, assume that the functions of an image noise reduction process that reduces the mosquito noise and block noise characteristic of compressed image data, and the functions of an image sharpening process in accordance with an embodiment of the present invention, are implemented in the same system. In this case, when both functions operate independently, it is conceivable that noise reduced by the image noise reduction process may be once again emphasized by the image sharpening process in some cases. Thus, it is conceivable to parameterize, for each image portion, information indicating whether or not an image noise reduction process is being executed. On the basis of the parameter for the image noise reduction process, the sharpening control values may be reduced so as to not emphasize noise in the image portions where the image noise reduction process is being executed. For this reason, the image change feature value computed by the visual change feature value computing unit 104 as described earlier, for example, may be corrected according to the parameter for the image noise reduction process, and filter coefficients may be computed using the corrected image change feature value f. In so doing, it is possible to cause an image sharpening process in accordance with an embodiment of the present invention to operate cooperatively with an image noise reduction process, for example.

Exemplary Application of an Image Sharpening Process in Accordance with an Embodiment of the Present Invention to a Cyclic Noise Reduction Process One image process involves using a cyclic noise reduction process to reduce time-variable noise produced in motion images during the filming or transmission process, for example. Like the above case, when a cyclic noise reduction process is used in conjunction with an image sharpening process in accordance with an embodiment of the present invention, there is a similar possibility that noise reduced by the cyclic noise reduction process will be emphasized. For example, if an embodiment is configured to execute a cyclic noise reduction process prior to an image sharpening process, then the image sharpening process will be conducted after time-variable noise has been reduced, and thus the sharpness will be increased. However, it has been established that cyclic noise reduction processes exhibit bias in the noise reduction effects within single pictures. As a specific example, in cyclic noise reduction processes that use motion vectors, the noise removal effects are strong because motion vectors can be suitably calculated in regions of fine image detail. In contrast, since motion vectors are not consistently calculated in regions of flat image detail, sufficient noise removal effects might not be obtained. Consequently, when an image sharpening process is conducted so as to aggressively increase sharpness in regions where noise removal is insufficient, noise might be emphasized in those image portions. Meanwhile, since the regions where sufficient noise removal effects are obtained have fine image detail, the improvement in sharpness due to the image sharpening process may be easy to perceive visually. Thus, it is conceivable to configure an embodiment to compute feature values according to the noise reduction strength of the cyclic noise reduction process, for example, and execute an image sharpening process using filter coefficients calculated from the noise reduction strength feature values instead of the image change feature values f. Alternatively, it is conceivable to configure an embodiment to parameterize the noise reduction strength of the cyclic noise reduction process, and execute an image sharpening process using image change feature values f that have been corrected according to the parameters. According to such configurations, the sharpness can be effectively increased while avoiding the emphasis of noise.

Exemplary Execution of an Image Sharpening Process According to Brightness

In a video camera or other image recording apparatus, a phenomenon can occur wherein the amount of noise differs according to the brightness values of the image portions obtained by recording. Low light noise is a representative example of such noise. Low light noise occurs more readily as the image darkens, for example. Thus, it is conceivable to configure an embodiment to compute feature values associated with pixel brightness values, for example, and execute an image sharpening process using filter coefficients calculated from the brightness feature values instead of the image change feature values f. Alternatively, it is conceivable to configure an embodiment to parameterize pixel brightness values, and execute an image sharpening process using image change feature values f that have been corrected according to the parameters. According to such configurations, it becomes possible to increase sharpness without emphasizing low light noise, for example.

Exemplary Application of an Image Sharpening Process in Accordance with an Embodiment of the Present Invention to Skin Detection Meanwhile, there is a tendency for human skin to appear more wrinkled and blotchy in images as the sharpness is increased, for example. Thus, it is conceivable to define skin-related feature values, and execute an image sharpening process using the skin-related feature values instead of the image change feature values f described earlier. Alternatively, it is conceivable to configure an embodiment to calculate skin-related parameters, and execute an image sharpening process using image change feature values f that have been corrected by the parameters. In so doing, it becomes possible to conduct an image sharpening process such that the sharpness is not increased in partial regions where skin is detected in the overall image, for example, and the wrinkled, blotchy skin described above can be made less noticeable, for example.

It should be appreciated that the embodiments of the present invention herein illustrate examples for realizing the present invention. As demonstrated in the embodiments of the present invention, the matters in embodiments of the present invention have a respective correspondence with the matters for defining the claimed invention. Similarly, the matters for defining the claimed invention have a respective correspondence with similarly-named matters in embodiments of the present invention. However, it should be appreciated that the present invention is not limited to such embodiments, and that the present invention may be realized by performing various modifications without departing from the scope and spirit of the present invention.

Furthermore, the processing operations described in embodiments of the present invention may be applied as a method having these series of operations, as a program for causing a computer to execute these series of operations, or as a recording medium storing such a program. The medium used as the recording medium may be a Compact Disc (CD), MiniDisc (MD), Digital Versatile Disc (DVD), memory card, or Blu-ray Disc (BD)®, for example.

The present application contains subject matter related to that disclosed in Japanese Priority Patent Application JP 2010-077035 filed in the Japan Patent Office on Mar. 30, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing apparatus comprising:
a min-max pixel difference value computing unit configured to compute a min-max pixel difference value defined as a difference between a maximum pixel value and a minimum pixel value in an image portion for feature value computation that includes a target pixel selected from among pixels forming an input image and a number of neighbor pixels;
a maximum adjacent pixel difference value computing unit configured to compute a maximum adjacent pixel difference value defined as a maximum value among the difference values between adjacent pixels in the image portion for feature value computation;
an image change feature value computing unit configured to compute an image change feature value corresponding to a suddenness of image change in the image portion for feature value computation at least in part on the basis of the min-max pixel difference value and the maximum adjacent pixel difference value;
a filter coefficient computing unit configured to compute filter coefficients at least in part on the basis of the image change feature value; and
a sharpen filter configured to accept, as input, pixels forming an image portion for filter processing that include the same target pixel as the image portion for feature value computation and a number of neighbor pixels, and to compute an output pixel value for the target pixel in the image portion for filter processing by using filter coefficients corresponding to the image portion for feature value computation.

2. The image processing apparatus according to claim 1, wherein:
a number of pixels forming the image portion for feature value computation differs from a number of pixels forming the image portion for filter processing.

3. The image processing apparatus according to claim 1, further comprising:
a polynomial coefficient storage unit configured to store polynomial coefficients of a polynomial function for computing the filter coefficients;
wherein
the filter coefficient computing unit computes the filter coefficients by substituting the image change feature value into a variable of a polynomial function given by polynomial coefficients stored in the polynomial coefficient storage unit.

4. The image processing apparatus according to claim 1, wherein:
the image change feature value computing unit:
sets a maximum value as the image change feature value in a case where the computed maximum adjacent pixel difference value is greater than or equal to an upper threshold value preset in association with the computed min-max pixel difference value,
sets a minimum value as the image change feature value in the case where a maximum adjacent pixel difference value is less than or equal to a lower threshold value preset in association with the min-max pixel difference value, and
computes the image change feature value at least in part on the basis of a ratio of a difference between the upper threshold value and the lower threshold value and a difference between the maximum adjacent pixel difference value and the lower threshold value, in a case where the maximum adjacent pixel difference value lies between the upper threshold value and the lower threshold value.

5. An image processing method comprising the steps of:
computing a min-max pixel difference value defined as a difference between a maximum pixel value and a minimum pixel value in an image portion for feature value computation that includes a target pixel selected from among pixels forming an input image and a number of neighbor pixels;

computing a maximum adjacent pixel difference value defined as a maximum value among the difference values between adjacent pixels in the image portion for feature value computation;

computing an image change feature value corresponding to a suddenness of image change in the image portion for feature value computation at least in part on the basis of the min-max pixel difference value and the maximum adjacent pixel difference value;

computing filter coefficients at least in part on the basis of the image change feature value; and inputting pixels forming an image portion for filter processing that includes the same target pixel as the image portion for feature value computation and a number of neighbor pixels, and computing an output pixel value for the target pixel in the image portion for filter processing by using filter coefficients corresponding to the image portion for feature value computation.

* * * * *